United States Patent
Tang et al.

(10) Patent No.: US 11,263,093 B2
(45) Date of Patent: Mar. 1, 2022

(54) METHOD, DEVICE AND COMPUTER PROGRAM PRODUCT FOR JOB MANAGEMENT

(71) Applicant: EMC IP Holding Company LLC, Hopkinton, MA (US)

(72) Inventors: Jun Tang, Chengdu (CN); Yi Wang, Chengdu (CN); Qingxiao Zheng, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 47 days.

(21) Appl. No.: 16/799,425

(22) Filed: Feb. 24, 2020

(65) Prior Publication Data
US 2021/0117291 A1   Apr. 22, 2021

(30) Foreign Application Priority Data
Oct. 17, 2019   (CN) .......................... 201910990434.3

(51) Int. Cl.
*G06F 11/14* (2006.01)
(52) U.S. Cl.
CPC ...... *G06F 11/1466* (2013.01); *G06F 11/1451* (2013.01); *G06F 11/1461* (2013.01)
(58) Field of Classification Search
CPC ............. G06F 11/1466; G06F 11/1451; G06F 11/1461
USPC ......................................................... 711/162
See application file for complete search history.

(56) References Cited

U.S. PATENT DOCUMENTS

2008/0263551 A1*  10/2008  Ali ..................... G06F 11/1461
                                                              718/102
2021/0240575 A1*  8/2021  Mulheren ........... G06F 11/1464

* cited by examiner

*Primary Examiner* — Yair Leibovich
(74) *Attorney, Agent, or Firm* — Womble Bond Dickinson (US) LLP

(57) ABSTRACT

Embodiments of the present disclosure relate to method, device and computer program product for job management. The method comprises: obtaining an execution plan associated with a plurality of backup jobs including a target backup job, the execution plan at least indicating a size of backup data and start times of the plurality of backup jobs; determining, based on the execution plan, a first set of backup jobs to be executed in parallel at a start time of the target backup job; determining a predicted backup speed of executing the first set of backup jobs in parallel at the start time of the target backup job; and determining, at least based on the predicted backup speed and the size of the backup data of the target backup job, time required for executing the target backup job. Accordingly, the time required for executing the backup jobs can be more accurately predicted.

20 Claims, 3 Drawing Sheets

METHOD, DEVICE AND COMPUTER PROGRAM PRODUCT FOR JOB MANAGEMENT

CROSS-REFERENCE TO RELATED APPLICATION

This patent application claims priority, under 35 U.S.C. § 119, of Chinese Patent Application No. 201910990434.3, filed Oct. 17, 2019, which is incorporated by reference herein in its entirety.

FIELD

Embodiments of the present disclosure generally relate to the computer field, and more specifically, to a method for job management, an electronic device and a computer program product.

BACKGROUND

In recent years, as computer technology develops, people produce a huge amount of digital data every day. Users or service providers usually protect data security through data backup to avoid certain unexpected emergencies. The data to be backed up usually are huge, and people expect to predict the time required for executing data backup to schedule the jobs more efficiently. Therefore, the approach for effectively predicting the time required for data backup has gained so much attention.

SUMMARY

Embodiments of the present disclosure provide a solution for job management.

In accordance with a first aspect of the present disclosure, there is provided a method for job management. The method comprises: obtaining an execution plan associated with a plurality of backup jobs including a target backup job, the execution plan at least indicating a size of backup data and start times of the plurality of backup jobs; determining, based on the execution plan, a first set of backup jobs to be executed in parallel at a start time of the target backup job; determining a predicted backup speed of executing the first set of backup jobs in parallel at the start time of the target backup job; and determining, at least based on the predicted backup speed and the size of the backup data of the target backup job, time required for executing the target backup job.

In accordance with a second aspect of the present disclosure, there is provided a device for job management. The device comprises: at least one processing unit; and at least one memory being coupled to the at least one processing unit and storing instructions for execution by the at least one processing unit, the instructions, when executed by the at least one processing unit, causing the device to perform acts comprising: obtaining an execution plan associated with a plurality of backup jobs including a target backup job, the execution plan at least indicating a size of backup data and start times of the plurality of backup jobs; determining, based on the execution plan, a first set of backup jobs to be executed in parallel at a start time of the target backup job; determining a predicted backup speed of executing the first set of backup jobs in parallel at the start time of the target backup job; and determining, at least based on the predicted backup speed and the size of the backup data of the target backup job, time required for executing the target backup job.

In accordance with the third aspect of the present disclosure, there is provided a computer program product stored in a non-transitory computer storage medium and comprising machine-executable instructions which, when executed by a device, cause the device to perform an action according to any steps of method in the first aspect.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements in exemplary embodiments of the present disclosure.

DETAILED DESCRIPTION OF EMBODIMENTS

Figure 1:
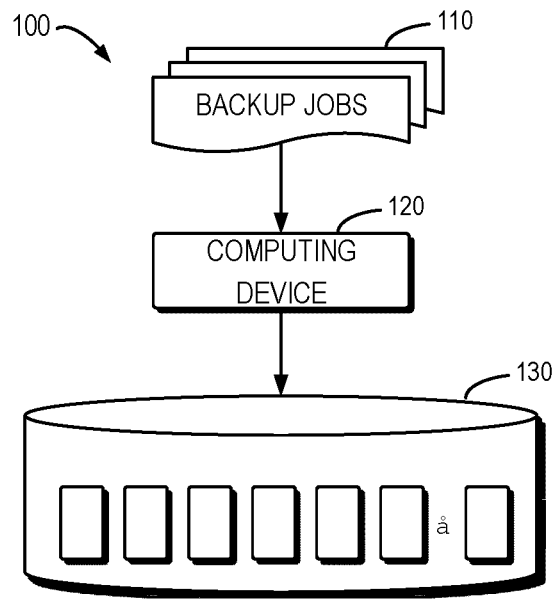
FIG. 1 illustrates a schematic diagram of an environment where embodiments of the present disclosure can be implemented.

Preferred embodiments of the present disclosure will be described as follows in greater detail with reference to the drawings. Although preferred embodiments of the present disclosure are illustrated in the drawings, it is to be understood that the present disclosure described herein may be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second"

and others may denote different or identical objects. The following text may also contain other explicit or implicit definitions.

As described above, people hope that they can predict a time duration required for a backup operation. A traditional solution may predict the duration required for a backup operation to be executed based on historical backup operations. For example, when some traditional solutions determine a predicted time duration of a backup operation by storing historical backup data size and duration, it is required to traverse historical backup data records during the prediction. In these solutions, a huge amount of historical data are to be stored and the prediction process consumes more time as the data size grows. Considering timeliness desired by the backup operation, it is unacceptable that a plenty of time are spent on predicting the backup operation.

In accordance with embodiments of the present disclosure, there is provided a solution for job management. In the solution, an execution plan associated with a plurality of backup jobs including a target backup job is obtained, wherein the execution plan at least indicates a size of backup data and start times of the plurality of backup jobs; a first set of backup jobs to be executed in parallel at a start time of the target backup job is determined based on the execution plan; a predicted backup speed for executing the first set of backup jobs in parallel at a start time of the target backup job is determined; and the time required for executing the target backup job is determined at least based on the predicted backup speed and the size of backup data of the target backup job. By comprehensively evaluating the situations of parallel execution of the backup jobs at different time moments, embodiments of the present disclosure can more accurately predict the time required for executing the backup job.

FIG. 1 illustrates a schematic diagram of an environment 100 where embodiments of the present disclosure can be implemented. As shown, the environment 100 includes a computing device 120 and a backup storage apparatus 130, wherein the computing device 120 may receive one or more backup jobs to be executed, preprocess the data to be backed up and then write the preprocessed data into the backup storage apparatus 130. Specifically, the computing device 120, for example, may segment the data to be backed up according to a predetermined size, which may be correspondingly configured based on requirements of different backup systems.

Afterwards, the computing device 120 for example also may determine, based on hash values of data in each data block, whether the data have already been stored in the backup storage apparatus 130. If the data have been stored in the backup storage apparatus 130, the computing device 120 may avoid overwriting the data into the data block. If not, the computing device 120 may write the data into the data block and record hash values of the data block for de-duplication operations at the next backup.

Since the computing device 120 may concurrently execute different number of backup jobs with various types at different time moments, the backup speed at different time moments also may change. The computing device 120 can determine, based on an execution plan for a backup job 110, time required for performing each of the backup jobs, so as to provide better support for users or developers to prepare a work plan.

Figure 2:
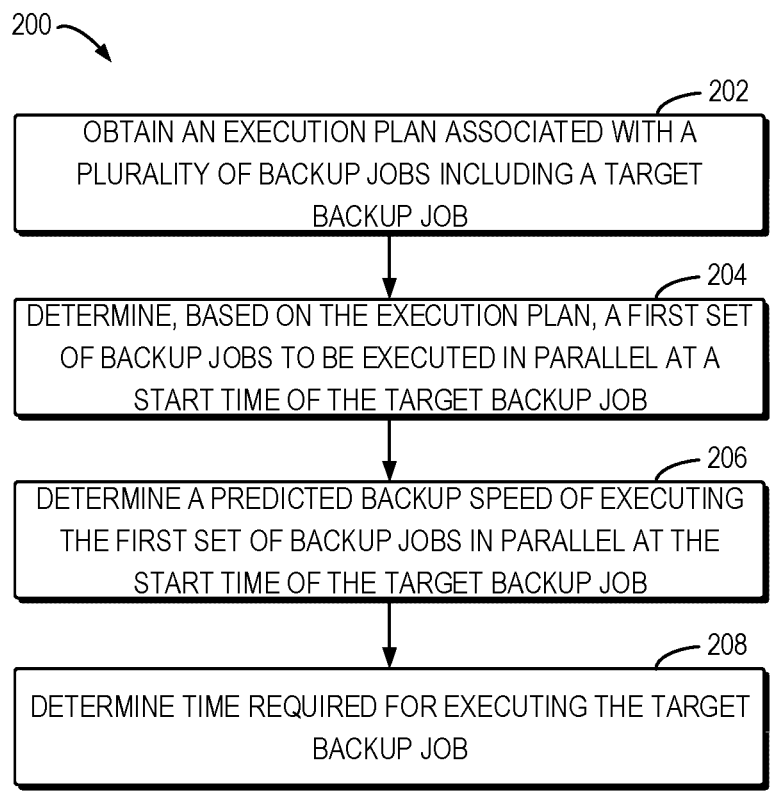
FIG. 2 illustrates a flowchart of a process for job management in accordance with some embodiments of the present disclosure.

The process of job management in accordance with embodiments of the present disclosure is described below with reference to FIGS. 2 to 5. FIG. 2 illustrates a flowchart of a process 200 for job management in accordance with some embodiments of the present disclosure. The process 200 may be implemented by the computing device 120 in FIG. 1. For the sake of discussion, the method 200 is described below with reference to FIG. 1.

At 202, the computing device 120 obtains an execution plan associated with a plurality of backup jobs including the target backup job. The execution plan at least indicates a size of backup data and start times of a plurality of backup jobs. In some embodiments, the computing device 120 may receive a plurality of backup jobs 110 submitted by one or more users. When submitting the backup jobs 110, the users generally specify the start times for executing the backup jobs. Upon receiving the backup jobs 110, the computing device 120 also may determine the sizes of backup data the backup jobs 110, such as 100 GB. Such information, for example, may be organized into an individual file to indicate the execution plan of the backup jobs 110.

Figure 3:
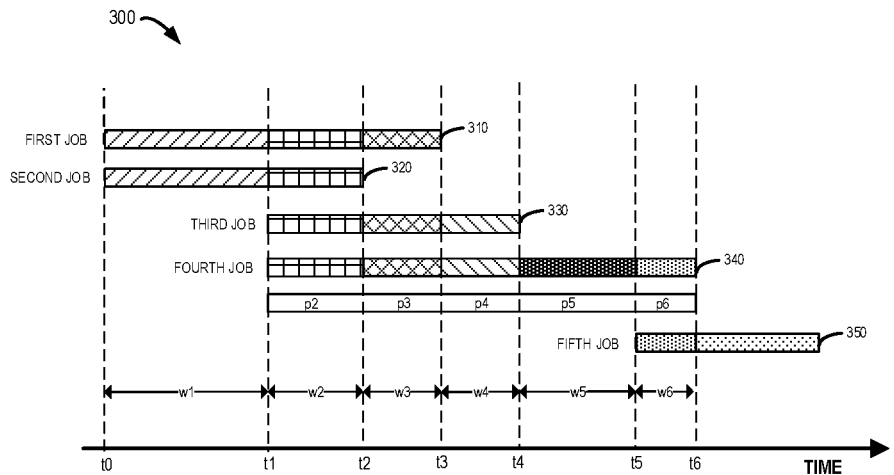
FIG. 3 illustrates a schematic diagram of determining the time for executing the backup jobs in accordance with embodiments of the present disclosure.

FIG. 3 illustrates a schematic diagram 300 of a process for determining the time for executing the backup jobs in accordance with embodiments of the present disclosure. For example, as shown in FIG. 3, the computing device 120 may receive a first job 310, a second job 320, a third job 330, a fourth job 340 and a fifth job 350. The fourth job 340, for example, may be a target backup job whose time duration is to be determined (i.e., the fourth backup job 340). The computing device 120 may determine from the execution plan that the start time for the first job 310 and the second job 320 is t0, the start time for the third job 330 and the fourth job 340 is t1 and the start time for the fifth job 350 is t5. To facilitate the description, the sizes of the backup data of the first job 310 to the fifth job 350 may be represented as s1, s2, s3, s4 and s5.

Continue to refer to FIG. 2. At 204, the computing device 120 determines, based on the execution plan, a first set of backup jobs to be executed in parallel at the start time of the target backup job. Back to the example of FIG. 3, for example, if the start time of the target backup job (i.e., the fourth job 340) is t1, the computing device 120 may determine a first set of backup jobs to be executed at time moment t1 based on the execution plan. A detailed process of 204 is described below with reference to FIG. 4, which illustrates a flowchart of a process for determining a first set of backup jobs in accordance with embodiments of the present disclosure.

Figure 4:
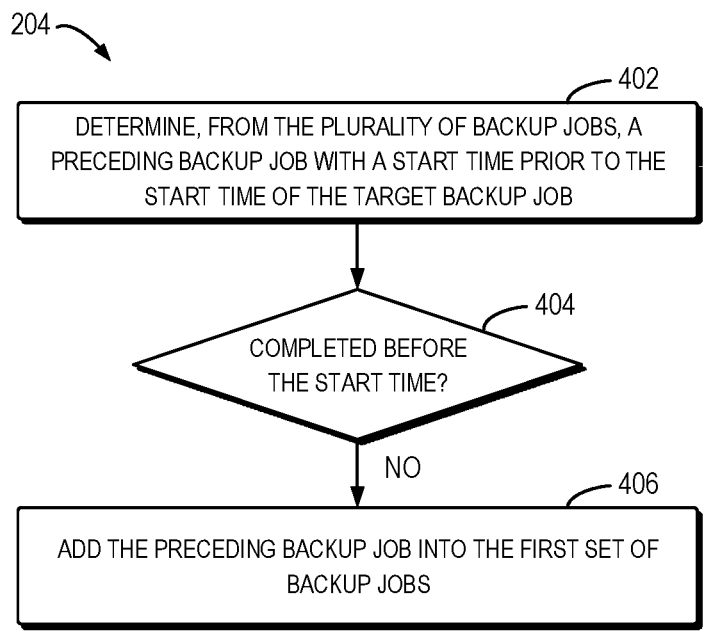
FIG. 4 illustrates a flowchart of a process for determining a first set of backup jobs in accordance with embodiments of the present disclosure.
Figure 5:
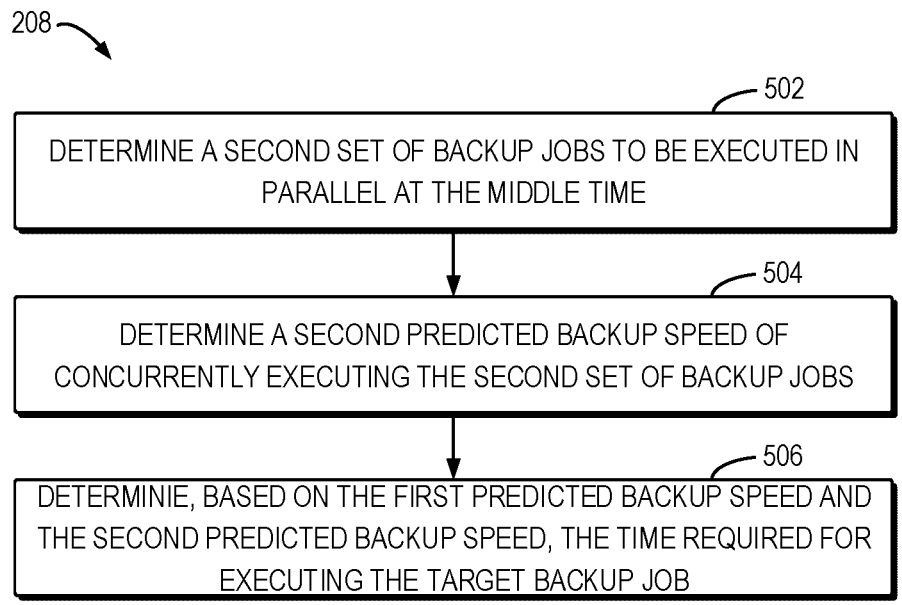
FIG. 5 illustrates a flowchart of a process for determining the time for executing the target backup jobs in accordance with embodiments of the present disclosure.

As shown in FIG. 4, the computing device 120 may determine at box 402 a preceding backup job with a start time prior to a start time of the target backup job in a plurality of backup jobs. Continuing to refer to FIG. 3 as the example, the computing device 120 may determine, from a plurality of backup jobs (first job 310 to fifth job 350), that the backup jobs with a start time prior to t1 include the first job 310 and the second job 320 (both having the start time of t0).

At 404, the computing device 120 may determine, based on the start time and the size of the backup data of the preceding backup job, whether the preceding backup job is completed before the start time of the target backup job. In response to determining that the preceding backup job is not completed before the start time of the target backup job at 404, the method proceeds to 406, at which the computing device 120 may add the preceding backup job to the first set of backup jobs.

Continuing to refer to FIG. 3 as the example, for the first job 310 and the second job 320 having the start time prior to t1, the computing device 120 may determine whether the first job 310 and the second job 320 are completed before t1. To be specific, the computing device 120 may firstly determine a backup speed for concurrently executing the first job 310 and the second job 320. In some embodiments, the computing device 120, for example, may determine the backup speed based on historical backup situation. For example, the computing device 120 may determine, from the historical backup situation, the speed of a backup job having similar backup data size to the first job 310 and the second job 320 as the backup speed. In some embodiments, the computing device 120 also may determine, based on the machine learning method, the backup speed for concurrently executing the first job 310 and the second job 320.

When the backup speed for concurrently executing the first job 310 and the second job 320 is determined, the computing device 120 may determine, based on the size of the backup data s1 of the first job 310 and the size of the backup data s2 of the second backup job 320, their predicted completing time moments and determine whether the time moments are later than the start time t1 of the target backup job (i.e., fourth job 430). When it is determined that the predicted completing time moment is later than the start time t1, the computing device 120 may add the first job 310 and the second job 320 into the first set of backup jobs.

Additionally, the computing device 120 also may determine, based on the execution plan, other backup jobs starting simultaneously with the target backup job in a plurality of backup jobs. For example, with respect to the example of FIG. 3, the computing device 120 also may add the third job 330 starting at time moment t1 into the first set of backup jobs. Accordingly, the computing device 120 may determine that the first set of backup jobs to be executed in parallel at time moment t1 include the first job 310, the second job 320, the third job 330 and the target backup job (i.e., fourth job 340).

Continuing to refer to FIG. 2, at 206, the computing device 120 determines a predicted backup speed for concurrently executing the first set of backup jobs at the start time of the target backup job. In some embodiments, the computing device 120 may determine, according to specific information of each backup job in the first set of backup jobs, the predicted backup speed.

In some embodiments, the computing device 120 may firstly obtain a metric associated with the first set of backup jobs. In some examples, the metric may include: a number of backup jobs using storage blocks of variable size in the first set of backup jobs and/or a number of backup jobs using storage blocks of a fixed size in the first set of backup jobs. In data backup, one of the following two different backup modes usually is selected: using storage blocks of a fixed size or using storage blocks of variable sizes. As the mechanisms for the two backup modes are different, the backup speed in the two backup modes also varies. Therefore, the number of backup jobs in each mode will affect the backup speed.

In another example, the metric may include: a number of backup jobs having a specific backup cycle in the first set of backup jobs. Different backup cycles (e.g., once every month or once every year) will affect a proportion of data size which is in fact not written due to the de-duplication mechanism to the data size to be backed up, which also affects the final backup speed.

In a further example, the metric may include: a number of concurrent threads of the first set of backup jobs. It can be easily understood that multi-thread configuration of each backup job also affects the final backup speed.

The computing device 120 may determine the predicted backup speed for concurrently executing the first set of backup jobs using one or more of the above exemplary metrics. It should be understood that the prediction may also be performed using any other suitable metrics. In some embodiments, the computing device 120 for example may determine, based on the historical backup situation, a function relation between the above metrics and the final backup speed (e.g., via function fitting) and determine the predicted backup speed based on the metrics of the first set of backup jobs.

In some embodiments, the computing device 120 may determine the predicted backup speed for concurrently executing the first set of backup jobs using machine learning-based methods. Specifically, the computing device 120 may process metrics with a speed determination model to determine the predicted backup speed, wherein the speed determination model is a machine learning model trained on the basis of the metrics determined from a set of reference concurrent backup jobs and corresponding ground-truth backup speeds. Examples of the machine learning model include, but not limited to, various types of Deep Neural Network (DNN), Convolutional Neural Network (CNN), Support Vector Machine (SVM), decision tree and random forest model etc.

Specifically, the computing device 120, for example, may obtain the above metrics of the set of backup jobs executed in parallel during the backup process in practice as inputs of the speed determination model and use the ground-truth backup speed at which the set of concurrent jobs are executed as the training goal of the speed determination model, so as to bring the output of the speed determination model close to the ground-truth backup speed.

In some embodiments, the computing device 120 may sample the backup speeds for parallel executing a group of historical concurrent backup jobs to obtain a set of sampled backup speeds and determine the ground-truth backup speed based on the set of sampled backup speeds. For example, the computing device 120 may periodically sample the ground-truth-time backup speeds over a cycle of is and determine the ground-truth backup speed based on the set of sampled backup speeds. For example, the computing device 120 may take an average of the reorganized sampled backup speeds as the ground-truth backup speed for training the speed determination model.

In some embodiments, the computing device 120 also may perform data filtering on the reorganized sampled backup speeds. Specifically, the computing device 120 may determine at least one sampled backup speed based on a difference between a sampled backup speed and a further sampled backup speed at an adjacent moment in the set of sampled backup speeds.

For example, the computing device 120 may calculate a difference value between two adjacent sampled backup speeds in the set of sampled backup speeds. The computing device 120 may further determine an average of the difference values and filter out the sampled backup speed pairs with a difference value larger than a specific threshold (e.g., average of the difference values), so as to determine from the set of sampled backup speeds at least one sampled backup speed. In this way, sample errors or other reasons may result into certain abnormal sample speeds.

In some embodiments, the computing device 120 also may determine the ground-truth backup speed based on the at least one sampled backup speed. For example, the computing device 120 may calculate an average of the at least one filtered sampled backup speed and use the average as the ground-truth backup speed for training the speed determination model.

Through the above training, the speed determination model is capable of determining, from the information of a set of backup jobs executed in parallel, a backup speed at which the computing device 120 backs up the set of backup jobs in parallel. It should be understood that the computing device 120 also may determine, according to metrics determined on the basis of the first job 310 and the second job 320, the backup speed for concurrently executing the first job 310 and the second job 320, which is described above with reference to FIG. 3, using the speed determination model.

Continuing to refer to FIG. 2, at 208, the computing device 120 determines, at least based on the predicted backup speed and the size of the backup data of the target backup job, the time required for executing the target backup job. In some embodiments, the computing device 120 for example may determine the time required for executing the target backup job based on the size of the backup data of the target backup job and the predicated backup speed.

In some embodiments, it is possible that the first set of backup jobs executed concurrently by the computing device 120 before completing the target backup job may change. For example, it is possible that one of the backup jobs has been completed or a new backup job to be executed appears and the backup speed at this time may change. The detailed process of 208 is described below with reference to FIG. 5, which illustrates a flowchart of a process for determining the time for executing the target backup job in accordance with embodiments of the present disclosure.

As shown, at 502, in response to completing at least one of the first set of backup jobs at a middle time or beginning to execute an additional backup job at the middle time, the computing device 120 may determine a second set of backup jobs to be executed in parallel at the middle time. Continuing to refer to FIG. 3 as the example, when it is determined that the predicated backup speed (known as first predicted backup speed to facilitate description) for concurrently executing the first job 310, the second job 320, the third job 330 and the fourth job 340 is p2 according to the above described method, the computing device 120 may determine predicted completion time of the first job 310 to the fourth job 340 based on the sizes of backup data s1 to s4 corresponding to the first job 310 to the fourth job 340.

For example, with respect to the first job 310 and the second job 320, the computing device 120 may determine the completed data size, calculate the residual data size to be backed up at moment t1 and determine the residual backup time on the basis of the residual data size and the first predicted backup speed p2. For example, the computing device 120 may determine that a duration of w2 is expected to be spent on the second job 320 to complete its backup and it is determined that the second job 320 is completed earliest among the first job 310 to the fourth job 340.

Based on the above determination, the computing device 120 may determine that the backup jobs executed in parallel at time moment t2 (i.e., t1+w2) will change. Specifically, the computing device 120 may determine that the second set of backup jobs executed in parallel at moment t2 only includes the first job 310, the third job 330 and the fourth job 340.

At 504, the computing device 120 may determine a second predicted backup speed for concurrently executing the second set of backup jobs. In some embodiments, the computing device 120, for example, may determine the second predicted backup speed using the method described above with reference to 206. Specifically, the computing device 120 may determine metrics of the second set of backup jobs and process the metrics using the speed determination model to determine the second predicted backup speed. Continuing to refer to the example of FIG. 3, the computing device 120 may determine the second predicted backup speed for concurrently executing the first job 310, the third job 330 and the fourth job 340 as p2.

At 506, the computing device 120 may determine, based on the first predicted backup speed and the second predicted backup speed, the time required for executing the target backup job. In some embodiments, the computing device 120, for example, may determine the size of the backup data completed between the start time and the middle time and then determine the residual data size to be backed up from the middle time. As for the example of FIG. 3, the computing device 120 may determine that the size of the backup data completed by the computing device 120 from t1 to t2 is w2*p2 and the residual backup data size of the target backup job (i.e., fourth job 340) is s4−w2*p2.

Furthermore, the computing device 120 for example may determine, according to the second predicted backup speed p3 and the residual backup data size s4−w2*p2, the time required for completing the target backup job (i.e., fourth job 340) as w2+(s4−w2*p2)/p3.

It should be understood that the computing device 120 may iteratively execute the process from 502 to 506, to more accurately determine the time required for executing the target backup job. Continuing to refer to FIG. 3 as the example, the computing device 120 may determine, based on the predicted backup speed p3, that the backup of the first job 310 will be completed at time moment t3, i.e., the computing device 120 may determine that the backup jobs to be executed in parallel at time moment t3 only include the third job 330 and the fourth job 340. The computing device 120 may further determine, according to the metrics determined on the basis of the third job 330 and the fourth job 340, a predicted backup speed for concurrently executing the third job 330 and the fourth job 340 as p4.

As shown in FIG. 3, when it is determined that the predicted backup speed for concurrently executing the third job 330 and the fourth job 340 is p4, the computing device 120 for example may determine that the third job 330 will be completed at the time moment t4. That is, the computing device 120 may determine that the backup jobs to be executed in parallel at time moment t4 only include the fourth job 340. The computing device 120 may further determine, according to the metrics determined from the fourth job 340, a predicated backup speed p5 for executing the fourth job 340.

Furthermore, the computing device 120 also may determine that the backup of the fifth job 350 starts at time moment t5. In other words, the computing device 120 may determine that the backup jobs to be executed in parallel at moment t3 include the fourth job 340 and the fifth job 350. The computing device 120 may further determine, according to the metrics determined from the fourth job 340, a predicted backup speed p6 for executing the fourth job 340 and the fifth job 350.

Moreover, the computing device 120 may determine that the fourth job 340 is completed at time moment t6 and the backup jobs executed in parallel before time moment t6 will not change. At this time, the computing device 120 may determine the time moment t6 as the moment at which the backup of the fourth job 340 is to be completed.

Based on the above described procedure, the computing device 120 may determine the time required for completing the target backup job (i.e., fourth job 340) as w2+w3+w4+w5+w6, wherein w2 is determined based on the residual data size of the second job 320 at t1 and the predicted backup speed p2; w3 is determined based on the residual data size of the first job 310 at t2 and the predicted backup speed p3; w4 is determined based on the residual data size of the third job 330 at moment t3 and the predicted backup speed p4; w5 is determined based on the start time of the fifth job 350; and w6 is determined based on the residual data size of the fourth job 340 at moment t5 and the predicted backup speed p6.

Based on the above solution, embodiments of the present disclosure may determine, based on the specific situation of the backup jobs executed in parallel within different time periods, different backup speeds within different time periods, so as to more accurately predict the time required for executing the backup jobs and provide better support for users to draft a work plan.

In some embodiments, the computing device 120 may provide the time determined for executing the target backup job in the form of text, graphics, audio or video, such that the users may more intuitively understand the time required for the submitted backup jobs and make a better arrangement for the work to be done.

Figure 6:
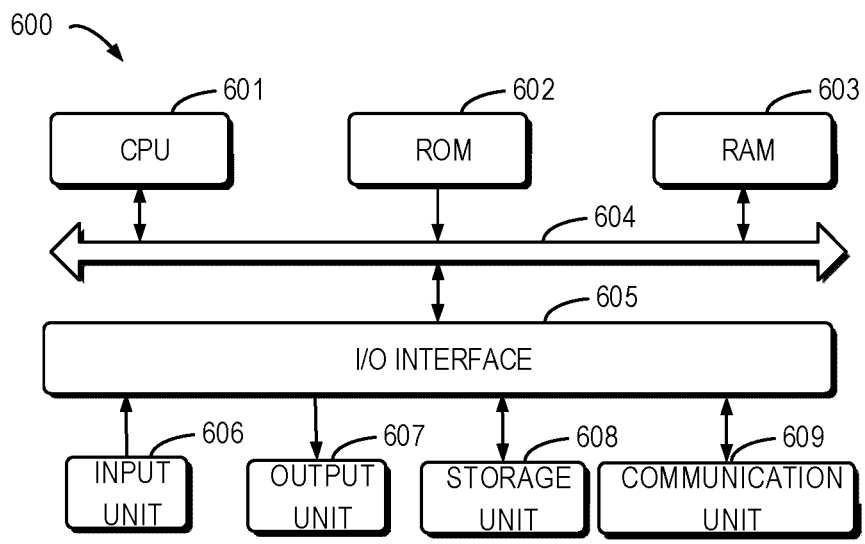
FIG. 6 illustrates a schematic block diagram of an example device for implementing embodiments of the present disclosure.

FIG. 6 shows a schematic block diagram of an example device 600 that can be used to implement embodiments of the present disclosure. For example, the computing device 120 according to embodiments of the present disclosure can be implemented by device 600. As shown, device 600 includes a central processing unit (CPU) 601 that can perform various appropriate actions according to computer program instructions stored in read only memory (ROM) 602 or loaded from storage unit 608 into a random access memory (RAM) 603. In the RAM 603, various programs and data required for the operation of the device 600 can also be stored. The CPU 601, the ROM 602, and the RAM 603 are connected to each other through a bus 604. An input/output (I/O) interface 605 is also coupled to bus 604.

A plurality of components in device 600 are coupled to I/O interface 605, including: input unit 606, such as a keyboard, mouse, etc.; output unit 607, such as various types of displays, speakers, etc.; storage unit 608, such as a disk and an optical unit, etc.; and a communication unit 609 such as a network card, a modem, a wireless communication transceiver, and the like. Communication unit 609 allows device 600 to exchange information/data with other devices over a computer network such as the Internet and/or various telecommunication networks.

The various processes and processes described above, such as method 200, may be performed by processing unit 601. For example, in some embodiments, method 200 can be implemented as a computer software program that is tangibly embodied in a machine readable medium, such as storage unit 608. In some embodiments, some or the entire computer program may be loaded and/or installed onto device 600 via ROM 602 and/or communication unit 609. One or more actions of method 200 described above may be performed when a computer program is loaded into RAM 603 and executed by CPU 601.

The present disclosure can be a method, device, system and/or computer product. The computer product can include a computer readable storage medium with computer readable program instructions for performing various aspects of the present disclosure thereon.

A computer readable storage medium may be a tangible device that can hold and store the instructions used by the instruction execution device. The computer readable storage medium can be, for example, but not limited to, an electrical storage device, a magnetic storage device, an optical storage device, an electromagnetic storage device, a semiconductor storage device, or any suitable combination of the foregoing. More specific examples (non-exhaustive list) of computer readable storage media include: portable computer disks, hard disks, random access memory (RAM), read only memory (ROM), erasable programmable read only memory (EPROM) or flash memory), static random access memory (SRAM), portable compact disk read only memory (CD-ROM), digital versatile disk (DVD), memory stick, floppy disk, mechanical encoding device, for example, the hole card with instructions stored thereon or raised structure in groove, and any suitable combination of the above. The computer readable storage medium as used herein is not to be interpreted as a transient signal itself, such as a radio wave or other freely propagating electromagnetic wave, an electromagnetic wave propagating through a waveguide or other transfer medium (e.g., a light pulse through a fiber optic cable), or the electrical signal transferred through a wire.

The computer readable program instructions described herein can be downloaded from a computer readable storage medium to various computing/processing devices, or downloaded to an external computer or external storage device over a network, such as the Internet, a local area network, a wide area network, and/or a wireless network. The network may include copper transfer cables, fiber optic transfers, wireless transfers, routers, firewalls, switches, gateway computers, and/or edge servers. A network adapter card or a network interface in each computing/processing device receives computer readable program instructions from the network and forwards the computer readable program instructions for storage in a computer readable storage medium in each computing/processing device.

Computer program instructions for performing the operations of the present disclosure may be assembly instructions, instruction set architecture (ISA) instructions, machine instructions, machine related instructions, microcode, firmware instructions, state setting data, source code or object code written or in any combination of one or more programming languages including object oriented programming languages, such as Smalltalk, C++ and so on, as well as conventional procedural programming languages, such as "C" language or similar programming language. The computer readable program instructions can be executed entirely on the user's computer, partly on the user's computer, as a stand-alone software package, partly on the user's computer and partly on the remote computer, or entirely on the remote computer or server. In the case of a remote computer, the remote computer can be connected to the user's computer through any kind of network, including a local area network (LAN) or wide area network (WAN), or can be connected to an external computer (e.g., using an Internet service provider to access the Internet connection). In some embodiments, the customized electronic circuit, such as a programmable logic circuit, a field programmable gate array (FPGA), or a programmable logic array (PLA), can be customized by utilizing state information of computer readable program instructions. The electronic circuit can execute computer readable program instructions to implement various aspects of the present disclosure.

Various aspects of the disclosure are described herein with reference to flowcharts and/or block diagrams of methods, devices (systems) and computer products according to embodiments of the present disclosure. It will be understood that each block of the flowchart illustrations and/or block diagrams, and combinations of blocks in the flowcharts and/or block diagrams can be implemented by computer readable program instructions.

These computer readable program instructions can be provided to a processing unit of a general purpose computer, a special purpose computer or other programmable data processing apparatus to produce a machine such that when the instructions are executed by processing unit via a computer or other programmable data processing apparatus, devices that implement the functions/acts specified in one or more of the flowcharts and/or block diagrams are produced. The computer readable program instructions can also be stored in a computer readable storage medium that causes the computer, programmable data processing device, and/or other device to operate in a particular manner, such that the computer readable medium storing the instructions includes an article of manufacture that includes instructions for implementing various aspects of the functions/acts recited in one or more blocks of the flowcharts and/or block diagrams.

Computer readable program instructions can also be loaded onto a computer, other programmable data processing device, or other device to perform a series of operational steps on a computer, other programmable data processing device or other device to produce a process that a computer is implemented such that instructions executed on a computer, other programmable data processing apparatus, or other device implement the functions/acts recited in one or more of the flowcharts and/or block diagrams.

The flowchart and block diagrams in the drawings illustrate the architecture, functionality, and operation of possible implementations of devices, methods, and computer products according to various embodiments of the present disclosure. In this regard, each block in the flowchart or block diagram can represent a module, a program segment, or a portion of an instruction, module, the program segment, or a portion of the instruction includes one or more executable instructions for implementing principles. In some alternative implementations, the functions noted in the blocks may also occur in a different order than those illustrated in the drawings. For example, two consecutive blocks may be executed substantially in parallel, and they may sometimes be executed in a reverse order, depending upon the functionality involved. It is also noted that each block of the block diagrams and/or flowcharts, and combinations of blocks in the block diagrams and/or flowcharts, can be implemented in a dedicated hardware-based system that performs the specified function or action of principle or can be implemented with a combination of dedicated hardware and computer instructions.

The embodiments of the present disclosure have been described above, and the foregoing description is illustrative, not limiting, and not limited to the disclosed embodiments. Numerous modifications and changes will be apparent to those skilled in the art without departing from the scope of the invention. The choice of terms used herein is intended to best explain the principles, practical applications, or technical improvements of the techniques on the market, or enable other ordinary technical staffs in the art to understand the embodiments in the disclosure.

We claim:

1. A method for job management, comprising:
   sampling backup speeds for parallel executing group of historical concurrent backup jobs to obtain a trained goal ground truth backup speed;
   obtaining an execution plan associated with a plurality of backup jobs including a target backup job having backup data, the execution plan at least indicating a size of backup data of the target backup job and start times of the plurality of backup jobs, submitted by users;
   determining, based on the execution plan, a first set of backup jobs to be executed in parallel at a start time of the target backup job;
   obtaining metrics of the first set of backup jobs, the metrics including variable and fixed blocks sizes;
   determining, via function fitting, a predicted backup speed of executing the first set of backup jobs in parallel at the start time of the target backup job, based on the metrics and the ground truth backup speeds; and
   determining, at least based on the predicted backup speed and the size of the backup data of the target backup job, time required for executing the target backup job.

2. The method of claim 1, wherein determining the first set of backup jobs comprises:
   determining, from the plurality of backup jobs, a preceding backup job with a start time prior to a start time of the target backup job;
   determining, based on the start time and a size of backup data of the preceding backup job, whether the preceding backup job is to be completed before the start time of the target backup job; and
   in response to determining that the preceding backup job fails to be completed before the start time of the target backup job, adding the preceding backup job into the first set of backup jobs.

3. The method of claim 1, wherein determining the predicted backup speed comprises:
   obtaining a metric associated with the first set of backup jobs, the metric comprising at least one of the following: a number of backup jobs using storage blocks of a fixed size in the first set of backup jobs, a number of backup jobs using storage blocks of variable sizes in the first set of backup jobs, a number of backup jobs with a specific backup cycle in the first set of backup jobs, and a number of concurrent threads of the first set of backup jobs; and
   determining the predicted backup speed based on the metric.

4. The method of claim 3, wherein determining the predicted backup speed based on the metric comprises:
   processing the metric with a speed determination model to determine the predicted backup speed, wherein the speed determination model is a machine learning model trained based on metrics determined from a set of reference concurrent backup jobs and a corresponding ground-truth backup speed.

5. The method of claim 4, further comprising: determining the ground-truth backup speed by sampling backup speeds of concurrently executing the set of reference concurrent backup jobs to obtain a set of sampled backup speeds;
   determining at least one sampled backup speed based on a difference between a sampled backup speed and a further sampled backup speed at an adjacent time instant in the set of sampled backup speeds; and
   determining the ground-truth backup speed based on the at least one sampled backup speed.

6. The method of claim 1, wherein the predicted backup speed is a first predicted backup speed, and determining the time required for executing the target backup job comprises:
   in response to completing at least one of the first set of backup jobs at a middle time or beginning to execute an additional backup job at the middle time, determining a second set of backup jobs to be executed in parallel at the middle time;
   determining a second predicted backup speed of concurrently executing the second set of backup jobs; and determining, based on the first predicted backup speed and the second predicted backup speed, the time required for executing the target backup job.

7. The method of claim 1, further comprising:
providing time in form of at least one of: text, graphics, audio or video.

8. An electronic device, comprising:
at least one processing unit; and
at least one memory being coupled to the at least one processing unit and storing instructions for execution by the at least one processing unit, the instructions, when executed by the at least one processing unit, causing the device to perform acts comprising:
sampling backup speeds for parallel executing group of historical concurrent backup jobs to obtain a trained goal ground truth backup speeds;
obtaining an execution plan associated with a plurality of backup jobs including a target backup job having backup data, the execution plan at least indicating a size of backup data of the target backup job and start times of the plurality of backup jobs, submitted by users;
determining, based on the execution plan, a first set of backup jobs to be executed in parallel at a start time of the target backup job;
obtaining metrics of the first set of backup jobs, the metrics including variable and fixed blocks sizes;
determining, via function fitting, a predicted backup speed of executing the first set of backup jobs in parallel at the start time of the target backup job, based on the metrics and the ground truth backup speeds; and
determining, at least based on the predicted backup speed and the size of the backup data of the target backup job, time required for executing the target backup job.

9. The device of claim 8, wherein determining the first set of backup jobs comprises:
determining, from the plurality of backup jobs, a preceding backup job with a start time prior to a start time of the target backup job;
determining, based on the start time and a size of backup data of the preceding backup job, whether the preceding backup job is to be completed before the start time of the target backup job; and
in response to determining that the preceding backup job fails to be completed before the start time of the target backup job, adding the preceding backup job into the first set of backup jobs.

10. The device of claim 8, wherein determining the predicted backup speed comprises:
obtaining a metric associated with the first set of backup jobs, the metric comprising at least one of the following: a number of backup jobs using storage blocks of a fixed size in the first set of backup jobs, a number of backup jobs using storage blocks of variable sizes in the first set of backup jobs, a number of backup jobs with a specific backup cycle in the first set of backup jobs, and a number of concurrent threads of the first set of backup jobs; and
determining the predicted backup speed based on the metric.

11. The device of claim 10, wherein determining the predicted backup speed based on the metric comprises:
processing the metric with a speed determination model to determine the predicted backup speed, wherein the speed determination model is a machine learning model trained based on metrics determined from a set of reference concurrent backup jobs and a corresponding ground-truth backup speed.

12. The device of claim 11, the acts further comprising:
determining the ground-truth backup speed by
sampling backup speeds of concurrently executing the set of reference concurrent backup jobs to obtain a set of sampled backup speeds;
determining at least one sampled backup speed based on a difference between a sampled backup speed and a further sampled backup speed at an adjacent time instant in the set of sampled backup speeds; and
determining the ground-truth backup speed based on the at least one sampled backup speed.

13. The device of claim 8, wherein the predicted backup speed is a first predicted backup speed, and determining the time required for executing the target backup job comprises:
in response to completing at least one of the first set of backup jobs at a middle time or beginning to execute an additional backup job at the middle time, determining a second set of backup jobs to be executed in parallel at the middle time;
determining a second predicted backup speed of concurrently executing the second set of backup jobs; and
determining, based on the first predicted backup speed and the second predicted backup speed, the time required for executing the target backup job.

14. The device of claim 8, the acts further comprising:
providing time in a form of at least one of: text, graphics, audio or video.

15. A computer program product stored on a non-transitory computer storage medium and comprising machine-executable instructions which, when running in a device, cause the device to perform operations, the operations comprising:
sampling backup speeds for parallel executing group of historical concurrent backup jobs to obtain a trained goal ground truth backup speeds;
obtaining an execution plan associated with a plurality of backup jobs including a target backup job having backup data, the execution plan at least indicating a size of backup data of the target backup job and start times of the plurality of backup jobs, submitted by users;
determining, based on the execution plan, a first set of backup jobs to be executed in parallel at a start time of the target backup job;
obtaining metrics of the first set of backup jobs, the metrics including variable and fixed blocks sizes;
determining, via function fitting, a predicted backup speed of executing the first set of backup jobs in parallel at the start time of the target backup job, based on the metrics and the ground truth backup speeds; and
determining, at least based on the predicted backup speed and the size of the backup data of the target backup job, time required for executing the target backup job.

16. The computer program product of claim 15, wherein determining the first set of backup jobs comprises:
determining, from the plurality of backup jobs, a preceding backup job with a start time prior to a start time of the target backup job;
determining, based on the start time and a size of backup data of the preceding backup job, whether the preceding backup job is to be completed before the start time of the target backup job; and in response to determining that the preceding backup job fails to be completed before the start time of the target backup job, adding the preceding backup job into the first set of backup jobs.

17. The computer program product of claim 15, wherein determining the predicted backup speed comprises:
obtaining a metric associated with the first set of backup jobs, the metric comprising at least one of the following: a number of backup jobs using storage blocks of a fixed size in the first set of backup jobs, a number of backup jobs using storage blocks of variable sizes in the first set of backup jobs, a number of backup jobs with a specific backup cycle in the first set of backup jobs, and a number of concurrent threads of the first set of backup jobs; and
determining the predicted backup speed based on the metric.

18. The computer program product of claim 17, wherein determining the predicted backup speed based on the metric comprises:
processing the metric with a speed determination model to determine the predicted backup speed, wherein the speed determination model is a machine learning model trained based on metrics determined from a set of reference concurrent backup jobs and a corresponding ground-truth backup speed.

19. The computer program product of claim 18, wherein the operations further comprise: determining the ground-truth backup speed by
sampling backup speeds of concurrently executing the set of reference concurrent backup jobs to obtain a set of sampled backup speeds;
determining at least one sampled backup speed based on a difference between a sampled backup speed and a further sampled backup speed at an adjacent time instant in the set of sampled backup speeds; and
determining the ground-truth backup speed based on the at least one sampled backup speed.

20. The computer program product of claim 15, wherein the predicted backup speed is a first predicted backup speed, and determining the time required for executing the target backup job comprises:
in response to completing at least one of the first set of backup jobs at a middle time or beginning to execute an additional backup job at the middle time, determining a second set of backup jobs to be executed in parallel at the middle time;
determining a second predicted backup speed of concurrently executing the second set of backup jobs; and
determining, based on the first predicted backup speed and the second predicted backup speed, the time required for executing the target backup job.

* * * * *